US012596946B2

(12) United States Patent
Bakshi

(10) Patent No.: US 12,596,946 B2
(45) Date of Patent: Apr. 7, 2026

(54) QUANTUM METADATA LINEAGE TRACING USING QUANTUM MULTIPART ENTANGLED TWIN TECHNOLOGY

(71) Applicant: Bank of America Corporation, Charlotte, NC (US)

(72) Inventor: Sakshi Bakshi, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 573 days.

(21) Appl. No.: 18/123,411

(22) Filed: Mar. 20, 2023

(65) Prior Publication Data

US 2024/0320530 A1 Sep. 26, 2024

(51) Int. Cl.
*G06N 10/20* (2022.01)

(52) U.S. Cl.
CPC .................................... *G06N 10/20* (2022.01)

(58) Field of Classification Search
None
See application file for complete search history.

(56) References Cited

U.S. PATENT DOCUMENTS 10,445,170 B1 10/2019 Subramanian
10,489,726 B2 * 11/2019 Castinado ................ G06N 5/01

11,086,751 B2 8/2021 Moresmau et al.
11,176,498 B2 11/2021 Castinado
11,422,731 B1 8/2022 Potashnik et al.
11,436,204 B2 9/2022 Maxey et al.
11,520,801 B2 12/2022 Ponnada et al.
11,601,266 B1 * 3/2023 Stapleton ................ G06F 21/72
11,895,232 B1 * 2/2024 Stapleton ............. H04L 9/0861
2016/0328253 A1 * 11/2016 Majumdar ............ G06N 10/80
2018/0247236 A1 * 8/2018 Castinado .......... G06Q 10/0631
2020/0090086 A1 * 3/2020 Castinado ............. G06N 10/40
2022/0188270 A1 6/2022 Thuma et al.
2022/0198441 A1 * 6/2022 Dalton ................ G06Q 20/227
2024/0028939 A1 * 1/2024 Akhalwaya ............ G06N 10/40

* cited by examiner

*Primary Examiner* — Mujtaba M Chaudry
(74) *Attorney, Agent, or Firm* — Weiss & Arons LLP

(57) ABSTRACT

Apparatus for quantum data lineage tracing using a quantum multipart entangled twin is provided. The apparatus may include an enterprise system, a quantum data lineage tracing system and a quantum twinning simulation engine. The enterprise system may include a plurality of subsystems. A first subsystem may receive data components. The tracing system may extract metadata, including data component properties, from data components. The tracing system may assign each property to a qubit. Each qubit may identify an entry location of the associated data component. The simulation engine may receive the qubits, process the qubits and entangle each qubit with one or more other qubits. The simulation engine may replicate a wave function for each qubit as the qubit is replicated to trace changes made to each data component as the data component is replicated. The simulation engine may use the replicated wave functions to identify changes made to data components.

9 Claims, 4 Drawing Sheets

QUANTUM METADATA LINEAGE TRACING USING QUANTUM MULTIPART ENTANGLED TWIN TECHNOLOGY

FIELD OF TECHNOLOGY

Aspects of the disclosure relate to quantum technology.

BACKGROUND OF THE DISCLOSURE

The amount of collected data is continuously growing. Within an enterprise, there are multiple systems that interact with, and share data with, each other. One data element that was received at the enterprise may be made available in multiple disparate systems within the enterprise. It should be noted that all of these systems may be interacting with each other. If a change is made to a data element in a first system, and the change is not propagated into the rest of the systems within the enterprise, the enterprise may include data discrepancies.

In addition to data discrepancies generated by changes made to data within a first system, data may evolve because of system requirements. As data flows from a source to a target, either within a single system or within an enterprise, data may incur various transformations.

One example of the foregoing discrepancies may involve an invoice. An invoice may include an invoice number. That invoice number may be put into the system. The invoice number may flow to a financial team and the financial team may reformat the invoice and associated invoice number. The term invoice number may be replaced with the term payment identifier. A user working within the system may not know from where the payment identifier originated (or where it can be traced). Data may become complex as it travels from system to system, and it may change form as it interacts with multiple systems.

The everchanging nature of data may create a problem in data integrity if a user is unable to trace a data element to its source. As such, data lineage may be compromised. Data lineage may provide the origin and/or the travel path of a data element.

There are data lineaging tools that can trace data elements within a system. However, the data lineaging tools must be deployed at every system within an enterprise in order for the data lineaging tools to properly identify the lineage of each data element within the system. This may be difficult to implement because different systems across an enterprise may use different technology and therefore, the same data lineaging tools may be unable to be deployed across an enterprise.

Currently, there is no solution that provides source-to-target data lineage information throughout a complex enterprise in real-time.

Therefore, it would be desirable to use a quantum metadata lineage tracing system.

SUMMARY OF THE DISCLOSURE

A system for tracing metadata of data elements as the data elements evolve through an enterprise system is provided. The metadata tracing system may utilize the multipartite entanglement quality of qubits. The metadata tracing system may include a multi-partite functionality in order to generate a digital twin of the enterprise system. Quantum computing operates on the concept of qubits.

The metadata tracing system may create a quantum twin of the metadata of the enterprise system. Every metadata element, or data field, may correspond to a qubit in the quantum twin of the metadata tracing system. All of the qubits may exist in an entangled state with each other because they are closely related to each other.

A quantum twin may be created for each data element included in the enterprise system. These entangled twins may use artificial intelligence ("AI") algorithms. The AI algorithms may create digital tracings for all the quantum twin qubits that exist. Wherever the data flows within the enterprise, the AI algorithms operating in tandem with the entangled twins may keep on tracing the data elements throughout the flow in the enterprise. The data elements may be connected to each other even if the data elements are working in silos—i.e., separate storage regions within an entity. As such, the metadata tracing system preferably traces each metadata element.

The metadata tracing system may also have a data discrepancy detection feature. The data discrepancy detection feature may detect discrepancies within the data elements in real-time. Any discrepancies that are detected may be flagged and stakeholders may be notified. The data discrepancy detection feature may identify failures that may be expected to occur in a downstream subsystem (within the enterprise system) because of upstream issue. The data discrepancy detection feature may also prevent bad downstream data from flowing to various subsystems (within the enterprise system). The data discrepancy detection feature may be operated in a selectable fashion.

The metadata tracing system may enable cross-lineaging across multiple systems within the ecosystem.

Within an enterprise system, the metadata tracing system may trace the metadata. The following steps may be included in the metadata tracing: extract the metadata—i.e., extract the properties of the data elements but not the data itself, analyze the properties, assign the properties to qubits where each qubit corresponds to one data field in the system. As such, the extracted metadata can be tracked from the time the corresponding data element enters the enterprise system. The qubits may include information relating to when the data field entered the enterprise system. The qubits may also include the logical business definition of the corresponding data field. As such, a user may not have to manually intervene with the metadata tracing system at a later point in order to identify which fields correspond to which other fields.

Once the assignment of the qubits to the metadata fields has been processed, the data fields may be entered into a smart quantum twinning simulation engine. A smart quantum twinning simulation engine may be the location where a quantum twin is generated. The smart quantum twinning simulation engine may be a cognitive AI supported engine which processes qubits as inputs. The smart quantum twinning simulation engine may include predefined rules. Based on these predefined rules as well as customizable business and technical rules, the smart quantum twinning simulation engine may create a quantum twin.

This quantum twin may be entangled with other quantum twins within the metadata tracing system. A genuine multipart engagement ("GME") state may be used to generate the entanglement. GME may be a controlled form of entanglement. GME state may be an entanglement state of a qubit wherein it is entangled with other qubits because a qubit can exist in multiple forms at one time. When the qubits interact with one other, the qubits have to interact with each and every state of each other qubit whereas every qubit will have one predominant state based on certain conditions. The interaction is where the entanglement happens. As such, if one qubit changes, the change will impact the other entangled qubit as well. Any changes within the enterprise system may cause a change in another location within the enterprise system. If something changes in one qubit at one subsystem, within the enterprise, it may impact a related data field. The impacted related data field may be flagged by the metadata tracing system. If a data field is modified in the enterprise system (also referred to as a base platform), the change may be propagated into the quantum twin.

The following is an example of changes being propagated through the enterprise system and the metadata tracing system. A first name—John—may be a data field that is received at the enterprise system. An email address—John's email address—may be a data field that is received at the enterprise system. The first name data field and the email address data field may be two separate data fields that are received together. John's name may change from John to Richard. As such, the first name data field may require modification. The email address data field may also require modification because the email address should be tagged to Richard instead of John. It should be understood from this example that a change made to one data field creates an impact in another data field as well. The metadata tracing system may track this required change using the entanglement properties. As such, when a change is made, the metadata tracing system is going to flag out other changes.

Additionally, when complex data flows into a system, many times the complex data includes multiple damaged records. For example, one hundred records may flow into the system and twenty records out of those one hundred records may be damaged. The damaged records may for example, include a numerical value in a name data field, where only a text value is allowed. The twenty damaged records may cause failures in subsystems with the enterprise system. The metadata tracing system may identify the potential failures before they cause damage to subsystems within the enterprise system. This is where the qubits will support each other. Any change that occurs within a subsystem of the enterprise system, is going to be communicated in real time with all of the other subsystems within the enterprise system using the data field qubits. The metadata tracing system may create a composite logical qubit. "Composite" refers to the feature that each data element, such as a name and/or an email identifier, can be a separate qubit, and a change at one qubit may impact another qubit. "Logic" may refer to feature that the metadata tracing system is understandable and can be cascaded.

Quantum twinning may enable the entanglement. A wave function for this qubit may be replicated. If data is flowing from a first subsystem within the enterprise to a second subsystem within the enterprise, the wave function created at the first subsystem may also be available to the qubit associated with the data field at the second subsystem system even though the field may have merged with another data field. Because the same wave function is being used throughout the enterprise system, it may be difficult to trace out the changes that are happening. Therefore, the real-time tracing is going to be utilized.

The real-time tracing may utilize the qubits along with the business rules and the history of the data. The real-time tracing may use the digital twinning algorithms and the quantum twins that are entangled with one another in a GME entangled state. It should be noted that a wave function for a first subsystem and a second subsystem may be independent in the initial subsystems and may become entangled in another subsystem. The tracing may occur in real time.

The metadata tracing system may include a quantum real time tracing evaluator. The quantum real-time tracing evaluator may trace changes throughout the system. The quantum real-time tracing evaluator may be enabled based on the wave function. The wave function may be a memory that the qubits carry relating to the relationship of the entangled state. The wave function, for every quantum state, may be independent. When a digital twin is created, the wave functions, for every quantum state, may become entangled with one another. Through these wave functions, the quantum twins may interact with each other. A quantum twin may be a virtual twin of the actual qubit that exists in multiple states.

Within the digital twin, the qubits may interact with each other in a quantum manner. The base system may interact with the quantum twin in a quantum entanglement as well. The quantum entanglement may utilize the wave function.

The metadata tracing system may include multiple components. A first component may be used to create a quantum twin. A second component may reflect or report quantum traceability metrics to trace how those quantum metrics are flowing within multiple systems to create a logical flow of that data within multiple systems.

The metadata tracing system may include a real-time platform. The real-time platform may enable a user to put in a data field and a user may be able to view an end-to-end view of the data and where a subsystem may fail. Notifications may be sent to downstream systems regarding potential failures. Notifications may also be sent out to the downstream systems to evaluate whether the data is, or is not, flowing as expected and/or if there are any potential issues. An example of a notification is that data element X may cause failures in subsystems A, B and C and/or data systems D, E and F may be affected.

The wave function may provide logical data links that can be tracked (and used to track the data properties). The data links may be maintained for the data tracing throughout the system. With any change in the data that occurs, the metadata tracing system may be able to learn as it grows. As such, the system may be capable of absorbing changes and transforming to invoke the change traceability on a platform.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
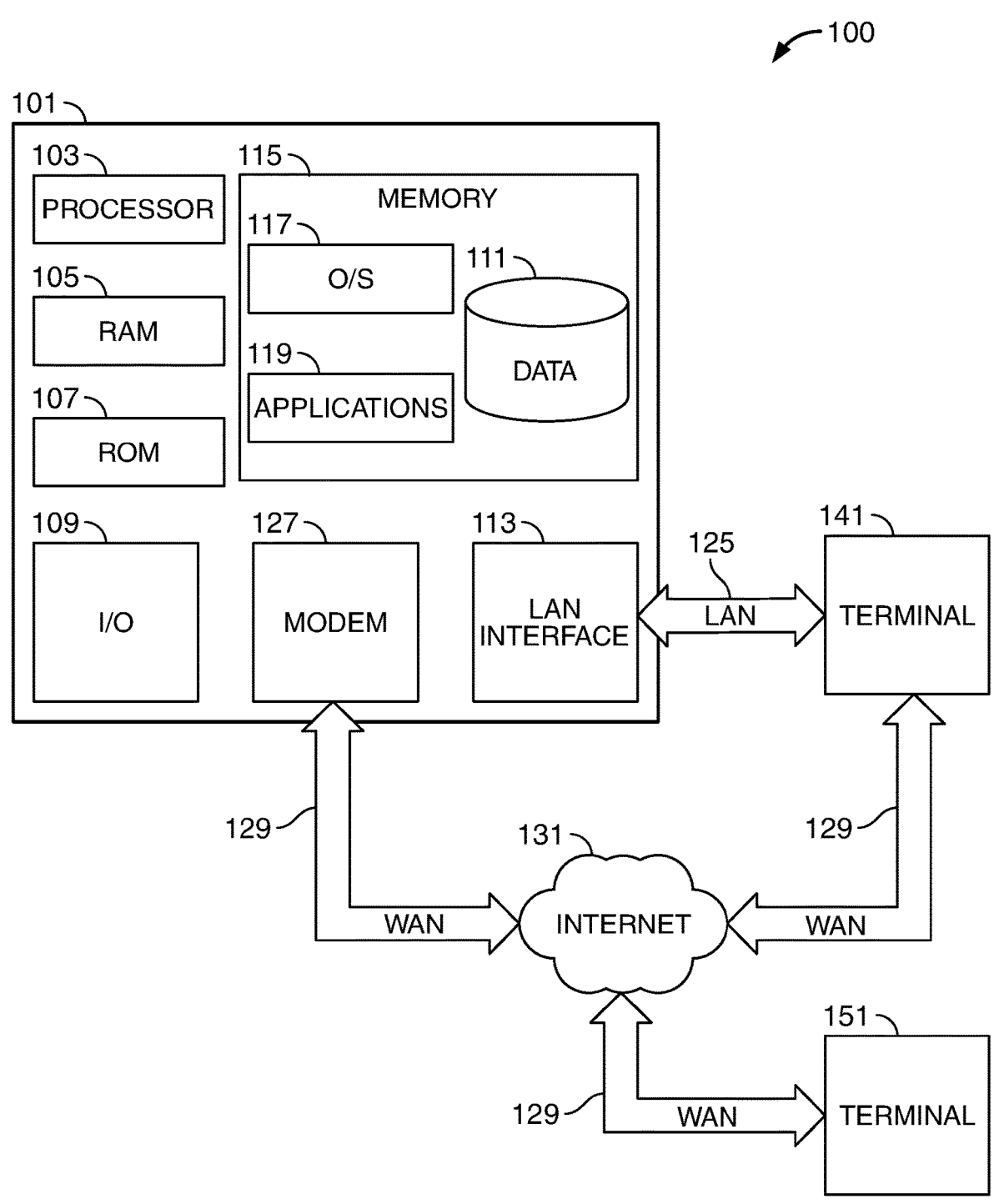
FIG. 1 shows an illustrative diagram in accordance with principles of the disclosure.

Apparatus and methods for quantum data lineage tracing using a quantum multipart entangled twin. Apparatus may include a hardware processor and/or a hardware memory.

Methods may include receiving a data element. Methods may include receiving metadata related to the data element. The data element and the metadata may be received together at a source system. In some embodiments, the metadata may be embedded within the data element. As such, the metadata may be extracted from the data element.

Methods may include allocating a first bit-memory location, at a silicon memory, for the data element.

Methods may include storing the data element at the first bit-memory location at the silicon memory. Methods may include allocating a first qubit-memory location, at a quantum memory, for the metadata. Methods may include storing the metadata at the qubit-memory location at the quantum memory.

Methods may include entangling the first-bit memory location with the first qubit-memory location. The entangling may be executed through a genuine multipartite entanglement ("GME") state. Methods may include transferring the data element from the first bit-memory location to a second bit-memory location. The second bit-memory location may be located at a second silicon memory.

Methods may include allocating a second qubit memory location at a second quantum memory, for the metadata. Methods may include entangling the second qubit-memory location with the first qubit-memory location. The entangling may be executed through a GME state. Methods may include entangling the second qubit-memory location with the second bit-memory location. The entangling may be executed through a GME state.

Methods may include enabling a user to view data lineage of the data element on a user interface. The user interface may interface with the first qubit-memory location and the second qubit-memory location. Methods may also include enabling a user to view potential errors of the data element on the user interface. The potential errors may include errors that may occur in downstream systems. The errors may be caused by modifications made to the data element at an upstream system. The user interface may occur in a real-time user interface platform.

A method for quantum data lineage tracing using a quantum multipart entangled twin is provided. The method may include receiving one or more data components at a subsystem. The subsystem may be a component of an enterprise system.

The method may include extracting one or more metadata sets from the one or more data components. The one or more metadata sets may include one or more properties of the one or more data components. An example of a metadata set may be a type of data expected within a data field. The type of data may be a string type, a numeral type, an enumerated type or any other suitable type.

The method may include assigning each property, included in the one or more properties, to a qubit, included in a plurality of qubits. Each property may correspond to a qubit in a quantum data lineage tracing system. Each qubit may identify an entry of an associated data component.

The method may include receiving the plurality of qubits at a quantum twinning simulation engine. The method may include processing the plurality of qubits as inputs at the quantum twinning simulation engine.

The method may include entangling each qubit in the plurality of qubits with one or more other qubits, included in the plurality of qubits. The entangling may occur at the quantum twinning simulation engine. The entangling may be executed via a GME state.

The method may include replicating a wave function for each qubit as the qubit is replicated to trace changes made to each data component throughout the enterprise system.

The method may include using the replicated wave function to identify and trace changes made to each data component that corresponds to each qubit throughout the enterprise system.

The method may include identifying one or more discrepancies in the changes made to the data components. The method may also include enabling a user to view the one or more data discrepancies of the data element on the user interface in a real-time user interface platform.

The method may include proactively notifying one or more stakeholders regarding the one or more discrepancies. The notifications may be transmitted via e-mail, text message, communication platform or any other suitable notification transmission method.

The method may include enabling a user to view data lineage of the data component on a user interface within a real-time user interface platform. The method may include enabling a user to view data linage of the data component on a user interface that interfaces with the quantum data lineage tracing system.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may comprise any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to transaction pattern tracking and prediction. The input/output module may also include one or more speakers for providing audio output and a video display device for providing textual, audio, audiovisual, and/or graphical output. The input and output may be related to computer application functionality. The input and output may be related to transaction pattern tracking and prediction.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related to performing various tasks. The various tasks may be related to transaction pattern tracking and prediction.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices.

These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
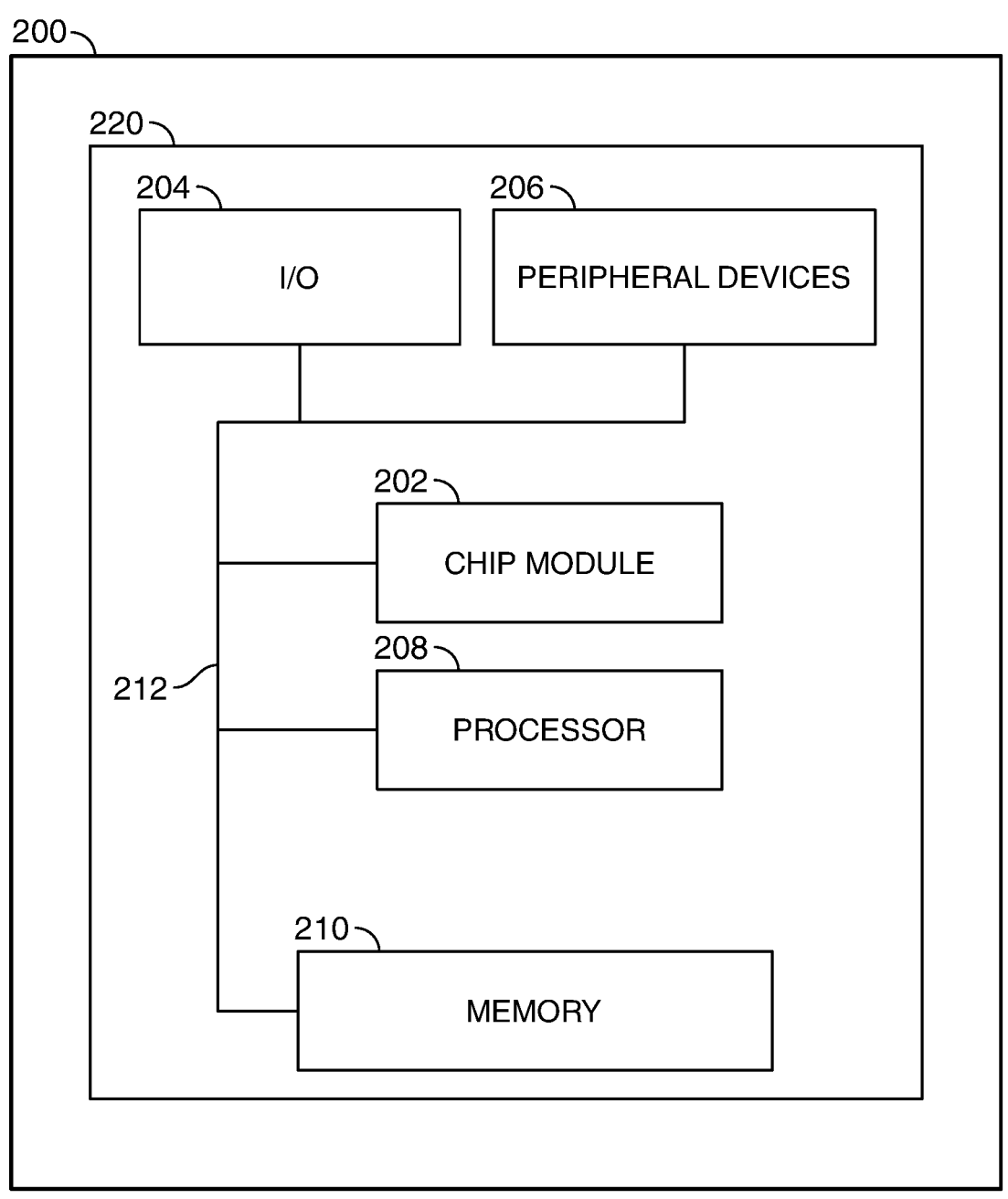
FIG. 2 shows another illustrative diagram in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
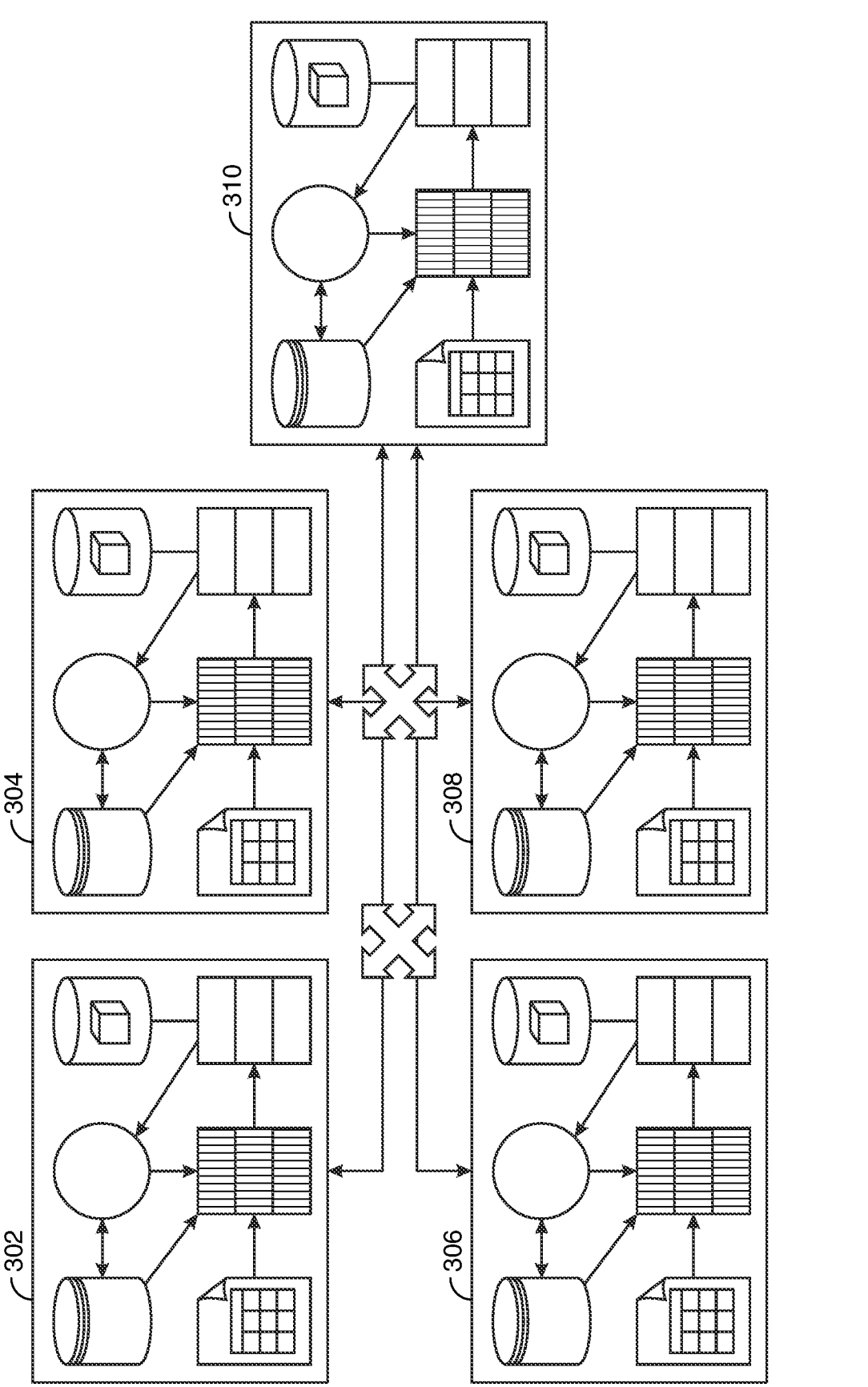
FIG. 3 shows yet another illustrative diagram in accordance with principles of the disclosure.

FIG. 3 shows an illustrative diagram. The illustrative diagram shows system 302, systems 304, system 306, system 308 and system 310. Each of systems 302, 304, 406, 308 and 310 may be included in an enterprise. Each of systems 302, 304, 306, 308 and 312 may operate in silos. Each of systems 302, 304, 306, 308 and 310 may be integrated with each other. There may be heterogeneous systems of record available in each of systems 302, 304, 306 and 310.

A data field may be received at system 302. The data field may include data. There may be metadata associated with the data field. For example, a data field may be a name data field. The name data field may include a first name and a last name. Metadata associated with the data field may indicate at date and time that the name data field was received at system 302. Metadata associated with the data field may also indicate the type of data that should be included in the data field. As such, a name data field may expect alphabetical characters as opposed to numerals. Metadata associated with the data field may also indicate that the data field includes first and last name data. Metadata associated with the data field may also include any other suitable data and/or information.

The data field received at system 302 may traverse multiple tables and/or documents within system 302. The data field received at system 302 may also be transferred to, or copied to, various other systems, such as system 304, system 306, system 308 and system 310. The arrows in between systems 302, 304, 306, 308 and 310 may indicate the data fields traversing, being transferred or being copied from one system to another system. The data field may undergo one or more changes at any of systems 302, 304, 306, 308 and 310. An example of change may be that a name data field that corresponds to a first name and last name may be divided into two data fields, a first name data field and a last name data field.

It may be important for an enterprise to be apprised of the data lineage of a data field. The following example illustrates one reason that data lineage may be important. At times, an entity may want to identify the origin of the data field. However, in the event that a data field has evolved as it was transferred from system to system, it may be difficult to understand the lineage of the data field without additional tools.

The cross-arrows in between the systems indicate that legacy cross-lineage has not been available across an enterprise, such as an enterprise that includes systems 302, 304, 306, 308 and 310. Data lineage tools may be available to identify lineage of data within each of systems 302, 304, 406, 308 and 310, however, the quantum data lineage tracing using quantum multipart entangled twins is a system that can be used to trace data lineage from a first system to a second system, within the enterprise.

Figure 4:
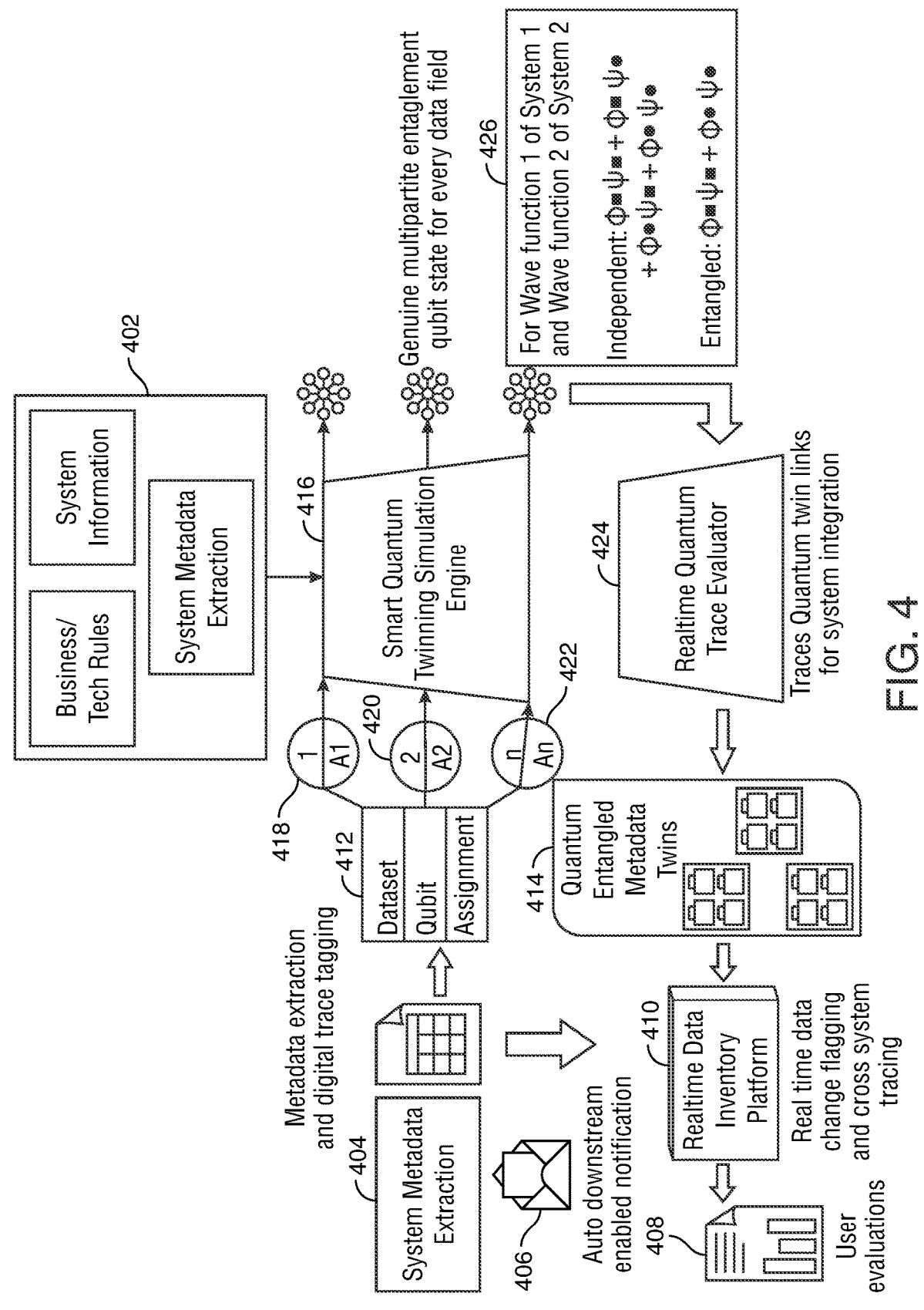
FIG. 4 also shows still another illustrative diagram in accordance with principles of the disclosure.

FIG. 4 shows an illustrative diagram of a system of quantum metadata lineage tracing using inline quantum multipart entangled twins, further using cognitive digital twinning and digital tracing parallel processing engines.

A data field may refer to a data component in a system. There may be multiple systems within an enterprise. Each system may have multiple heterogenous databases. Each database may have multiple tables. Each database may have multiple formats for storing data. There may be multiple data rules and/or transformations that may be applied to transfer data within or across databases. Some of the data systems may be interconnected in a complex web of interconnections, while some data systems may operate in silos. The quantum metadata lineage training system may enable a user to identify data lineage across multiple systems.

Metadata for a data field may be extracted, as shown at 404. The extracted metadata may ensure that the field properties are captures. Field properties and/or the metadata may remain intact even if the data format of the data field changes during data processing and/or transformations. The extracted metadata may be assigned to a qubit, as shown at 412. Because a qubit may operate in multiple states at a single time, the qubit may enable the system to simultaneously process and track any transformations and/or transformation logic applied to the data field. It should be noted that each qubit may correspond to one data field in a system. Metadata extracted from the system may ensure that the data fields that are tracked form logical data links without manual intervention. System space may be considered because while the metadata may be stored in more than one location—i.e., in a data location (bit location) and a qubit location. For data lineaging purposes, the data itself may not be stored again. Metadata may, at times, be considerably lighter (occupy less bits and/or qubits) than the data itself.

The data, also referred to as a dataset, shown at 412 and again at 418, the qubit, shown at 420 and 418 and the assignment, shown at 412 and again at 422, may be transferred to smart quantum twinning simulation engine 416. Business/technical rules, system information as well as system metadata extraction, shown at 402, may also be transferred to smart quantum twinning simulation engine 416.

Smart quantum twinning simulation engine 416 may receive qubits as an input field. Engine 416 may use a rules engine defined by the system metadata. The rules engine may be extracted together with business and technology rules transformations to the data provided. The rules engine may execute multiple digital twinning algorithms. The multiple digital twinning algorithms may be intertwined to operate in a parallel processing mode in order to create quantum twins.

The system may entangle multiple qubits together in a GME state. Every qubit, that can be traced back to same original data field, may be entangled with every other qubit, that can be traced back to the same original data field. Entangling all of the qubits together may enable the creation of a composite logical qubit. The logical qubit may operate as an ideal qubit. As such the redundancy of the share information may mean that, if one of the qubits within the logical qubit, decoheres, the information may be recovered from the remaining qubits included in the logical qubit.

A cross-reference may refer to a first qubit that is entangled with a second qubit, and the second qubit relates to a transformation or copy of the first qubit. A wave function, shown at 426, of a quantum entangled twin structure may be replicated for each cross-reference within the enterprise.

A real-time quantum trace evaluator, shown at 424 may trace quantum twin links for system integration. The real-time quantum trace evaluator, shown at 424, may process cognitive algorithms. The processing of cognitive algorithms may generate digital traces. The digital traces may be intermixed in order for quantum twins to create quantum traces. The quantum traces may enable tracking of data field changes across systems that interlinked through the quantum twins. A network of quantum trace enabled quantum twins may be indexed in order to augment processing speed and thereby enable the tracing to be processed in real-time. Digital tracing algorithms may be intertwined to trace qubit state changes and to crate quantum traces that may enable tagging a data field change across an enterprise in real-time. The quantum entangled metadata twins may be shown at 414.

Real-time data inventory platform, shown at 410, may be a centralized platform that stored system metadata. Platform

410 may flag a data field change in real-time. Platform 410 may provide users, such as downstream application owners, with changes that have been flagged. Auto downstream enabled notification may be shown at 406. User evaluations may be shown at 408.

Platform 410 may also enable end-to-end tracing and data mapping for any data field within the system. This end-to-end tracing and data mapping may reduce data redundancies and inconsistencies within the system. Platform 410 may enable real-time analytics for change coordination and data tracing for data standardization and evaluation.

Platform 410 may be supported by a cognitive parallel processing engine. The cognitive parallel processing engine may be an engine used for resource threads parallel management. The cognitive parallel processing engine may be able to scale up the processing power of the system based on the current system requirements and data quantities.

New data may be added to the enterprise and old data may be deleted from the enterprise. The quantum metadata lineage tracing system may be a self-learning system. An additional qubit dimension may be added in the event that new related data is introduced to the system. The additional qubit dimension may be linked to the other qubits through the GME quantum entangled state.

In the event that data is to be removed from the enterprise, the qubits associated with the data to be removed may be flagged and tracked. The flagged and tracked qubits may not incur a qubit change of state beyond a threshold. The threshold may be evaluated as an average of qubit state change. The threshold may be updated based on user-provided inputs and/or an update to the platform.

Thus, systems and methods for quantum metadata lineage tracing using quantum multipart entangled twin technology is provided. Persons skilled in the art will appreciate that the present invention can be practiced by other than the described embodiments, which are presented for purposes of illustration rather than of limitation. The present invention is limited only by the claims that follow.

What is claimed is:

1. A method for quantum data lineage tracing using a quantum multipart entangled twin, the method comprising:
   receiving one or more data components at a subsystem, said subsystem being a component of an enterprise system;
   extracting one or more metadata sets from the one or more data components, the one or more metadata sets comprising one or more properties of the one or more data components;
   assigning each property, included in the one or more properties, to a qubit, included in a plurality of qubits, each property corresponds to a qubit in a quantum data lineage tracing system, each qubit identifies an entry of an associated data component;
   receiving the plurality of qubits at a quantum twinning simulation engine;
   processing the plurality of qubits as inputs at the quantum twinning simulation engine;
   entangling, at the quantum twinning simulation engine, each qubit in the plurality of qubits, with one or more other qubits, included in the plurality of qubits;
   replicating a wave function for each qubit as the qubit is replicated to trace changes made to each data component throughout the enterprise system;
   using the replicated wave function to identify and trace changes made to each data component that corresponds to each qubit throughout the enterprise system;

identifying one or more discrepancies in changes made to the data components; and
proactively notifying one or more stakeholders regarding the one or more discrepancies.

2. The method of claim 1 wherein the entangling, at the quantum twinning simulation engine, each qubit in the plurality of qubits, with one or more other qubits, included in the plurality of qubits is executed through a genuine multipartite entanglement ("GME") state.

3. The method of claim 1 further comprising enabling a user to view data lineage of each data component on a user interface within a real-time user interface platform.

4. The method of claim 1 further comprising enabling a user to view the one or more discrepancies on a user interface in a real-time user interface platform.

5. The method of claim 1 further comprising enabling a user to view data lineage of the data component on a user interface that interfaces with the quantum data lineage tracing system.

6. An apparatus for quantum data lineage tracing using a quantum multipart entangled twin, the apparatus comprising:
   an enterprise system comprising a plurality of subsystems;
   a first subsystem, included in the plurality of subsystems, the first subsystem operable to receive one or more data components;
   a quantum data lineage tracing system, operating on a hardware processor and a hardware memory, the quantum data lineage tracing system operable to:
      extract one or more metadata sets from the one or more data components, the one or more metadata sets comprising one or more properties of the one or more data components;
      assign each property, included in the one or more properties, to a qubit, included in a plurality of qubits, each qubit, included in the plurality of qubits identifies an entry location of an associated data component;
   a quantum twinning simulation engine, operating on the hardware processor and the hardware memory, the quantum twinning simulation engine operable to:
      receive the plurality of qubits;
      process the plurality of qubits as inputs;
      entangle each qubit, included in the plurality of qubits, with one or more qubits, included in the plurality of qubits;
      replicate a wave function for each qubit as the qubit is replicated to trace changes made to each data component as the data component is replicated throughout the enterprise system; and
      use each replicated wave function to identify and trace changes made to each data component that corresponds to each qubit throughout the enterprise system.

7. The apparatus of claim 6 wherein the entry location is the first subsystem.

8. The apparatus of claim 6 further comprising a user interfacing platform, the user interfacing platform enables a user to view the identified and traced changes made to each data component.

9. The apparatus of claim 8 wherein the user interfacing platform proactively notifies one or more stakeholders of identified changes made to each data component.

* * * * *